3,226,784
INVESTMENT MOLDING USING REFRACTORY MATERIAL AND CERTAIN ORGANIC BASES
William H. Owen, Pittsburgh, and Robert K. Scott, Forest Hills Borough, Pittsburgh, Pa., assignors to Harbison-Walker Refractories Company, Pittsburgh, Pa., a corporation of Pennsylvania
No Drawing. Filed Nov. 22, 1963, Ser. No. 325,781
15 Claims. (Cl. 22—193)

This application is a continuation-in-part of previously copending, now abandoned, application Serial No. 317,039, entitled "Process," filed October 17, 1963, by William H. Owen and Robert K. Scott.

This invention relates to the manufacture of refractory molds and to the refractory materials for making such molds. More particularly, the invention relates to the process for preparing the materials for making investment and other types of molds, the materials for making molds generally used for metal casting, and to the processes of using such materials in making molds.

Precision castings of metal and other types of material cast in the molten state are used in many industries and, generally, such castings are made in expendable molds. There are three general types of processes for making the expendable molds, and these may be classified as the lost wax, the single investment and the double investment processes. These all have one thing in common: they are one-use molds, in which the mold is generally destroyed in removing the casting from it. To provide an economical process, a master mold or pattern is initially prepared, from which a plurality of refractory molds are made by one of the above processes. Such molds generally include a refractory and a binder. The art of preparing the materials for the molds has heretofore required precision techniques and highly trained personnel in the art of mixing the materials and preparing the expendable molds.

Most generally, the preparation of a binder was the critical part of the process, as it had to be carefully and critically prepared according to a most precise recipe. One commonly used type of binder included a mixture of an alcohol, an acid and an organic silicate, sometimes with additional ingredients added. To provide proper binding, to prevent separation of the liquid ingredients of the binder, to prevent formation of gas bubbles and the like, considerable care was required, by highly skilled artisans, not only for preparation of the materials but in the actual making of the molds.

According to the present invention, there is provided a simplified process for producing mold forms and the novel materials for production of such molds. The making of molds can be accomplished accurately and precisely by relatively unskilled labor, who are able to accurately reproduce a plurality of uniform and precise molds from master molds.

The invention includes the prior preparation of refractory grains coated with a gelling material as a uniform, thin coating on essentially each of the particles. The treated refractory grains, by reaction with a binder solution, form a uniform gel throughout the mass of the mold; and provide means for accurately controlling the gel time, to thereby produce optimum results in the formation of expendable working molds, in which molten metal or the like is to be cast. The refractory material of the invention provides means for a simplified process for producing uniform molds in an optimum time. Additionally, the invention provides a refractory material for molds, which has good stability and long storage life.

Included among the objects and advantages of the present invention is a novel refractory material which includes refractory grains substantially all of which are coated with a very thin coating of the precursor of a gel for forming molds.

Another object of the invention is to provide a refractory material coated with the precursor of a gel for refractory molds, which coated refractory material has a long storage life, since it is stable under normal storage conditions.

A further object of the invention is to provide a refractory material which is usable in a process for producing refractory molds economically, and which produces uniform molds under controlled conditions of time.

A still further object of the invention is to provide a refractory material comprising grains of refractory essentially each of which has a very thin coating of the precursor of a gel, which produces a uniform gel in a mold regardless of the shape of the mold and which provides means for predetermining the gelling time of the refractory binder mixture in the mold.

Another object of the invention is to provide a process for preparing refractory molds, which is simplified and provides an economical means for fabrication of reproducibly uniform refractory molds from a two-component system.

A still further object of the invention is to provide a process for producing refractory molds which provides two prepared components, each having good stability for normal storage and available for forming the uniform molds in normal practices without highly skilled artisans, and without the precise measuring and control equipment, formerly required.

These and other objects and advantages of the invention may be ascertained by referring to the following description, which is intended merely as illustrative and not limiting on the spirit or the scope of the invention.

The refractory grain, which may be used for making the molds, may be substantially any conventionally used refractory material, including metal oxide refractory grain which is chemically inert to the molten metal and other similar materials which may be cast in the mold. Examples of satisfactory refractory grain include alumina (99.9% $Al_2O_3$, by weight, on the basis of an oxide analysis), calcined clay (analyzing mostly $SiO_2$ and $Al_2O_3$, on an oxide basis), mullite, silica, less pure alumina, "Alundum" (a proprietary fused corundum material), sillimanite, various spinel minerals, such as chrome ore, zirconia (preferably stabilized zirconia), etc. The refractories used for making such molds are usually carefully screened, so as to provide a uniform product. For many purposes, the grains may generally be of a size so that about 50% is in the —6+30 mesh range, the rest being mostly in the —30+200 mesh range, with the remainder smaller than 200 mesh (all sizes, U.S. Standard series of screens). Other sizes may be used to meet the requirements of the particular problem.

The refractory grain is treated with a solution of volatile organic solvent and an organic base. The solvent is evaporated, leaving treated refractory grains, essentially each of which is covered with a thin coat of the organic base. The organic base is of the amine type having from 4–22 carbon atoms, preferably from 8–22 carbon atoms, or are alkali metal or alkaline earth salts of organic base compounds as discussed below. The organic bases resist polymerization and are essentially inert to the organic solvent in which they are dissolved. The organic base reacts with the acid in the fluid binder, increasing the pH and causing gelation of the binder material, usually an organic silicate. Therefore, the base must react with the acid in the fluid binder, preferably neutralizing the acid present, and generally to raise its pH from about 2 to about 4–7 causing gelation. One criteria of the base, which is critical, is its stability in air at ambient temperatures. The organic base must be stable in air, and have a sufficiently low vapor pressure at ambient temperatures to permit a reasonable storage life when incorporated in the refractory material. Generally, the organic base should have a vapor pressure of about 10 mm. of Hg or less at 760 mm. pressure. The base, preferably, is a solid or semi-solid at about room temperature and normally, should be solid or soapy from about 70–160° F. Examples of the amines include mono-, di-, and tri-alkyl-substituted amines. Certain ring compounds having an incorporated nitrogen atom are basic in characteristics and are, therefore, usable, including pyridines, quinolines, alkyl-substituted quinolines. Also usable are primary, secondary and tertiary amines, and certain other mono-, di-, and tri-amines which have straight alkyl chains, or a combination of the alkyl or aliphatic chain and cyclic compounds; for example, dimethylphenylamines.

In a preferred embodiment, long chain amines or diamines, which are wax-like or soap-like at ambient temperatures, provide the requirements listed above. Such compounds which provide satisfactory results include dodecyl amine; octadecyl amine; Duomeen C (one preferred embodiment), manufactured by the Armour Chemical Division of the Armour Company, and which is a coconut oil derivative of 1,3-propylene diamine. Other Duomeens including Duomeen O, Duomeen T, Duomeen S, etc. are satisfactory gelling agents for the present invention. The Duomeens are of the general type $$R \cdot HN \cdot CH_2 \cdot CH_2 \cdot CH_2 \cdot NH_2$$

where R is an alkyl group derived from a fatty acid. As stated above, Duomeen C is a coconut oil derivative and Duomeen S is a soya derivative, Duomeen O is an oleic derivative, Duomeen T is a tallow derivative, etc. Since they contain both primary and secondary amine groupings, they are strong difunctional bases.

Alkaloids are, also, capable of causing gelation, however, cost is a limiting factor to their use. Solid quaternary ammonium compounds, which are strong bases neutralizing the acid of the fluid binder and, therefore, may be used as a gelling agent for coating the refractory grain. Other organic bases having a sufficiently low vapor pressure at atmospheric pressure useful for carrying out our invention include diethylamino propylamine, diethylene triamine, triethylene tetramine, tetraethylene pentamine, imino-bispropylamine, dibutyl amine, 2-ethylhexyl amine, di (2-ethylhexyl)amine, dimethylamino propylamine, etc. In all instances the compositions are basic, stable and have a low vapor pressure at storage temperatures and pressures.

The refractory grains are coated by treating them with the amine dissolved in a volatile solvent such as low molecular weight alcohols, acetone, methyl ethyl ketone, etc., or the like, to produce a weak solution of the amine in the solvent. The solution may run from 1 to about 25% of the amine in the solvent. The amount of amine per pound of the refractory grains is carefully controlled, and the amount of the amine may run from 0.1% to about 2% of the weight of the refractory. A satisfactory amount extends from about 0.2 to about 1%, by weight, of the amine, while the preferred range is 0.3 to 0.7%. After the grains are treated with the solution, the solvent is evaporated leaving a film or coating of the amine on the grains.

Immediately prior to forming a mold the treated refractory is slurried with a gelling binder. A prehydrolyzed ethyl silicate in alcohol was used for most of the tests given below; however, other alkyl silicates or other binders which gel by the addition of alkaline substances can be used to form the slurry, which is common in the prior art. After the slurry is formed, it is poured about the master and permitted to gel. When sufficient set has developed, the body may be removed; and it may be fired up to a temperature of about 2000° F., where desired, to obtain some ceramic bonding and, thus, more strength.

Specifically, for the following tests, a calcined flint clay product of commerce, manufactured by the Harbison-Walker Refractories Company and termed "Flintmull GG3," mullite and mixtures thereof, are used as the refractories. The "Flintmull GG3" is a mixture of calcined flint clay and mullite grain. The mullite is calcined Alabama bauxite, which has been heated to a temperature sufficient to induce extensive reaction between the contained alumina and silica to obtain mullite crystals. Usually, in mixtures of the foregoing, the mullite comprises the –70 mesh fraction. These two refractories are screened on U.S. Standard screens, to obtain about the following exemplary screens:

Passing a 6 and held on a 12 mesh screen—10–20%
Passing a 12 and held on a 30 mesh screen—20–50%
Passing a 30 and held on a 200 mesh screen—45–85%
With any remaining material passing a 200 mesh screen.
The –200 mesh fraction may be on the order of 30%, by weight.

The sized refractory grain was sprayed while mixing or tumbling so as to contact them with a solution of the amine base in a volatile organic solvent, for example, with a 10% solution of Duomeen C in denatured ethyl alcohol. The mixing was accomplished in a concrete mixer or equivalent, to provide for uniform distribution of the amine solution throughout the refractory. The amount of solution was predetermined or precalculated to add the requisite amount of amine to the weighed refractory. After substantially all of the amine solution was sprayed or placed on the refractory grains and thoroughly mixed, the solvent was permitted to evaporate. The evaporation can be accomplished in a dryer or by exposing the coated grain to the atmosphere. This provides a thin residual film or coating of amine on the refractory surfaces. The amount of the amine on the refractory grains, for the individual tests, is shown in the following tables, which give the amount of the amine as a weight percent of the refractory. In the lower ranges, that is, from 0.1 to about 0.5% of amine, the coating on the refractory is almost a mono-molecular film which covers a considerable and major portion (50% or better) of the refractory surface. This provides a wide distribution of this gelling agent throughout a batch of these refractory grains.

The treated refractory grains were slurried with different mixtures of a prehydrolyzed alkyl silicate solution, and preferably ethyl silicate solutions, which are identified as A, B, and C in the following tables. They all contained about 18%, by weight, of $SiO_2$; and the degree of hydrolyzation was 83%, 75%, and 67%, respectively. We believe it important that no excess water be present in the ethyl silicate solution, beyond that just necessary for complete hydrolyzation in order to obtain the desired degree of stability in the product.

By varying the amount of the amine per pound of refractory, the gel times may be changed; for example, from about 2½ minutes to over 20 minutes, and longer, if desired. The longer gel times are considered somewhat undesirable, in that the gelled materials remain too rubbery for successful pattern removal, even after quite a period of time. Removal of the pattern appears to be most successful after about 2–5 times the gel time of the particular mix. Preferred practice is about three times the gel time of the particular mix. The actual time elapsed is, of course, dependent on the gel time. For example, if a mix gels in one minute, waiting three to five minutes is satisfactory for removal of the mold from the pattern If the gel time is on the order of ½ hour, however, a set of 2½ hours could cause some difficulty in removing the cast article from the master pattern. Gel completion can be determined by finger pressure; for example, the material just begins to resist pressure and does not flow.

Temperature has an effect on the gelling time. The time required for gelation is reduced by higher temperatures. Additionally, gel time can be decreased by addition of small amounts of distilled water to the prehydrolyzed ethyl silicate solution. Where the gel time is too short, as a result of high temperature or long mixing and pouring time, it can be increased by the use of a portion of untreated refractory material which, in effect, reduces the amount of gelling agent present per unit weight of refractory.

The prehydrolyzed ethyl silicate solution is a mixture of (1) ethyl silicate (40% $SiO_2$ is a preferred embodiment) in (2) ethyl alcohol with a small amount of (3) water and a small amount of (4) an acid, usually hydrochloric or sulphuric The following tables show the effect of the amount of gelling agent (1) standing alone and (2) coated on refractory grain, on gel time. These tests were conducted by initially coating the refractory grains with the desired amount of amine, and then slurrying the treated refractory with the binder solution, all as set out above.

TABLE I

| Refractory Grain | Gelling Agent, percent* | Initial Gel, min. (Stiffening) | Final Gel, min. (Set) |
|---|---|---|---|
| 400 g. Flintmull GG-3 | 0.33 | 7 | 15+ |
| None | 0.4 | 8¼ | 9 |
| None | 0.5 | 5¼ | 6¾ |
| None | 0.7 | 3½ | 4½ |
| 400 g. Flintmull GG-3 | 0.7 | 3 | 6 |
| 500 g. Mullite | 0.8 | 3 | 5 |
| None | 0.9 | 2½ | 4 |
| 400 g. Flintmull GG-3 | 1.0 | 2½ | 4 |
| 400 g. Flintmull GG-3 | 1.3 | 2 | 3 |

From the above, it is seen that the greater the amount of amine (called gelling agent) present the less time necessary for gelling. This includes not only the initial gel, but also the final gel time. The binder in these tests was "A," as above defined, at about 80° F.

We have stated we preferred that the selected amine be insoluble in water. However, this is not particularly critical as long as no excess water (water above that to completely prehydrolize the ethyl silicate) is in the binder solution. For example, diethylene triamine is completely miscible with water in all proportions, but it is an excellent gel precursor in the practice of this invention. The essential criteria here is that the amine have a low vapor pressure (less than 10 mm. Hg) and be soluble in the selected organic solvent (for example, ethyl alcohol). Still further, while we prefer a solid or semi-solid soapy consistency in the amine, this diethylene triamine material, which is somewhat soapy to the feel, flows quite readily.

Table II

| Refractory Grain | Agent, percent | Temp., °F. | Initial Gel, min. (Stiffening) | Final Gel, min. (set) |
|---|---|---|---|---|
| 425 g Flintmull GG-3 | 1.4 | 70 | 7 | n.d.* |
| 425 g Flintmull GG-3 | 1.4 | 75 | 7½ | n.d.* |
| 425 g Flintmull GG-3 | 1.4 | 80 | 6 | 12 |

* Not set after 15 minutes.

The temperature of the mixture has a definite effect on the gelling time. Generally, increased temperature reduces the time. This is established in the above table. No determination was made of the first two mixes reported. The binder in all of these tests was "C," and Duomeen C was the amine.

Table III

| Gelling Agent, percent | Temp., °F. | Water Added, percent | Initial Gel, min. |
|---|---|---|---|
| 1.4 | 70 | 0 | 7 |
| 1.4 | 70 | 10 | 4½ |
| 1.4 | 70 | 10+½ hr. standing | 1½ |
| 1.3 | 75 | 0 | 6½ |
| 1.3 | 75 | 5 | 4½ |
| 1.3 | 75 | 5+½ hr. standing | 3 |
| 1.3 | 75 | 10 | 4 |
| 1.3 | 75 | 10+½ hr. standing | 2 |
| 1.3 | 75 | 10+3 hrs, standing | 1 |

(By "standing," we mean the time delay after adding water and before mixing with refractory.)

The result of addition of water on the gel time is shown in the above table, when various amounts of water were added. The binder for these tests was, again, "C," and Duomeen C was the amine.

The time of gelling can be increased by adding untreated refractory, as shown in the following Table IV. The binder for these tests was, again, "A," and Duomeen C the amine.

Table IV

| Treated Refractory Grain | Untreated Refractory Grain | Gelling Agent, percent | Initial Gel, Min. | Final Gel, Min. |
|---|---|---|---|---|
| 400 | 0 | 1.3 | 2 | 3 |
| 300 | 100 | 1.0 | 2½ | 4 |
| 200 | 200 | 0.6 | 3 | 6 |
| 100 | 300 | 0.3 | 7 | *15 |

*Some liquid, alcohol, on top due to slow set.

The amount of silica in the binder solution does not affect the gel time, as shown in the following table:

Table V

| Solution and Percent Silica Content | Refractory Grain and Amount | Gelling Agent, Percent | Initial Gel, min. | Final Gel, min. |
|---|---|---|---|---|
| X*— 7.6 | None | 0.7 | 3½ | 4½ |
| A —18 | None | 0.7 | 3½ | 4½ |
| A —18 | 400 g Flintmull GG-3 | 0.7 | 3 | 6 |
| A —18 | 500 g Mullite | 0.8 | 3 | 5 |
| A —18 | None | 0.9 | 2½ | 4 |
| X*— 7.6 | None | 0.9 | 2½ | 4 |
| A —18 | 400 g Flintmull GG-3 | 1.0 | 2½ | 4 |
| B —18 | 400 g Flintmull GG-3 | 1.0 | 3 to 3.5 | 5 to 5.5 |

*Made up in laboratory.

By using the materials and process of the invention, persons with little technical acumen can readily mix the mold materials in the field without elaborate equipment or techniques. The prepared grains may be roughly measured, as, for example, so many quarts of the amine treated grains which are shipped, prepared and bagged and stored near the point of use. The binder may, also, be roughly measured; for example, so many pints of the solution. The two components are then mixed to form a slurry, which is poured into the master pattern. After gelling to final set, the mold is removed. For some molds, vibration may be necessary to prevent entrapping of air bubbles, etc.

The preparation of preferred binder solutions for the present invention are disclosed and claimed in copending application, Serial No. 223,623, filed September 14, 1962, by William H. Owen. That application is owned by a common assignee. For the sake of completeness of disclosure of the present invention, however, a suggested and preferred embodiment of this invention is as follows:

The amounts of particular ingredients in the binder and treated (coated) refractory grain mixture is about as follows: 400 grams of a refractory consisting essentially of 20% −8 on 30 mesh calcined flint clay, the balance being −100 mesh mullite, and the refractory coated with 0.55%, by weight, of Duomeen C, is mixed with 100 cc. of a binder solution containing 18% $SiO_2$, by weight, derived from ethyl silicate (40% $SiO_2$ content). Water in this 100 cc. of binder solution, to allow 83% hydrolyzation, is about 6 cc. Hydrochloric acid (preferred) or other inorganic acid such as sulfuric or nitric acid to yield a pH of approximately 2 amounts to about 1 cc. To obtain the 18%, by weight, $SiO_2$, about 40 cc. of the 40%, by weight, $SiO_2$ ethyl silicate is mixed with about 50 cc. of ethyl alcohol. After thorough mixing of the coated grain and the binder solution, the resulting slurry is poured over a master pattern, where gelation occurs in about 3 minutes at 75° F.

While the invention has been illustrated by specific examples, there is no intent to limit the spirit or scope of the invention, except as defined in the following claims:

We claim:

1. A formed refractory mold consisting essentially of, the reaction product of (1) particulate refractory material substantially uniformly coated with a thin coating of one of the class of organic bases and alkali metal and alkaline earth salts thereof, said organic bases and alkaline metal and alkaline earth salts thereof being characterized by having from 4–22 carbon atoms and being stable in air and having a vapor pressure of less than about 10 millimeters at temperatures of less than about 100° F. and which have a melting point of from 70–160° F., and (2) a binder solution of a prehydrolyzed alkyl silicate in a solvent.

2. A manufacture according to claim 1 in which the particulate refractory material is coated with an organic amine over the individual refractory particles in amount of from 0.1 to 2%, by weight, of the refractory.

3. A manufacture according to claim 2, in which the organic amine is di-ethylene tri-amine.

4. A manufacture according to claim 2, in which said organic amine is the reaction product of coconut oil and 1,3-propylene diamine and is present substantially as a monomolecular film on substantially all of the particles of said refractory.

5. A manufacture according to claim 1 in which the refractory is coated with an organic base which is the reaction product of a high molecular weight fatty acid and 1,3-propylene diamine.

6. A manufacture according to claim 1 in which said refractory is coated with dodecyl amine.

7. A manufacture according to claim 1 in which the refractory is coated with octadecyl amine.

8. A process for producing molds which comprises mixing refractory grains with a solution of an essentially nonvolatile, chemically basic, organic gelling agent in a volatile organic solvent, said organic gelling agent being characterized by its air stability at ambient temperature and being solid at temperatures of from 70–160° F., evaporating said volatile solvent from the refractory grains to produce refractory grains having a thin coating of said organic gelling agent substantially covering the individual grains, mixing said coated grains with a solution of a binder in a solvent therefor to form a slurry and then immediately pouring the resulting slurry in a master mold, said slurry being a prehydrolyzed alkyl silicate solution in a solvent therefore, allowing said slurry to gel, and then removing the gelled mold from the master.

9. A process according to claim 8 in which the gelling agent is an organic base having from 8 to 22 carbon atoms.

10. A process for producing molds which comprises mixing refractory grains with a solution of one of the class of nonvolatile organic bases and alkali metal and alkaline earth salts thereof in a low molecular weight volatile organic solvent, said organic bases and salts being characterized by having from 8–22 carbon atoms and being solid at temperatures of from 70–160° F., evaporating said volatile solvent from the refractory grains to produce refractory grains having a thin coating of one of said class substantially covering the individual grains, mixing said coated grains with a solution of a prehydrolyzed alkyl silicate solution in a solvent therefor to form a slurry, and then immediately pouring the resulting slurry in a master mold, allowing said slurry to gel, and then removing the gelled mold from the master.

11. A process according to claim 10 in which the organic bases are alkyl secondary amines.

12. A process according to claim 10 in which the organic base is the reaction product of coconut oil and 1,3-propylene diamine.

13. A procesc for producing refractory molds for use in casting of shapes from molten metal which comprises
A. Mixing refractory grain with a solution of,
(1) An essentially nonvolatile organic gelling agent, said organic gelling agent being characterized by the following:
(a) consisting only of atoms of the groups of alkali and alkaline earth metals, carbon, hydrogen, nitrogen and oxygen,
(b) being resistant to polymerization and reaction with an organic solvent carrier fluid at temperature of less than 160° F.,
(c) being solid to soapy in physical consistency and having a vapor pressure of no more than about 10 millimeters at a temperature in the range about 70 to 160° F.,
(d) being inert to refractory grain to be coated,
(e) being capable of essentially neutralizing a prehydrolyzed lower alkyl silicate solution at a temperature in the range 70 to 160° F. to a degree sufficient to release colloidal silica from said alkyl silicate; and
(2) a volatile organic solvent carrier fluid in which said gelling agent is completely soluble in the range 70 to 160° F.; the solution being present in a quantity sufficient to deposit from 0.1 to about 2.0% of the organic gelling agent, based on the weight of the refractory, on said refractory.
B. continuing the mixing for a time sufficient to allow the deposition of said 0.1 to 2%, by weight of the organic gelling agent,
C. evaporating at least about 95% of the said volatile solvent from the refractory grains to thereby recover a refractory grain having a thin coating of said organic gelling agent over at least about 50% of the exposed surface of said refractory,
D. mixing said coated grain with a solution of a binder to form a slurry of coated grain and said binder,
(1) said binder being a prehydrolyzed lower alkyl silicate having no water in excess of that just necessary for complete hydrolyzation of said silicate and capable of releasing colloidal silica throughout the said slurry in the presence of said gelling agent,
E. rapidly pouring the resulting slurry about a master pattern,
F. allowing the slurry to gel and set to a self-sustaining state of sufficient strength as to allow removal of said master pattern without destruction of the set gel, and
G. removing the resulting gelled mold from the master pattern.

14. A process for producing molds which comprises mixing refractory grains with a solution of one of the class of nonvolatile organic bases and alkali metal and alkaline earth salts thereof in a low molecular weight volatile organic solvent, said organic bases and salts being characterized by having from 4–22 carbon atoms and which are stable in air and having a vapor pressure of less than about 10 millimeters at a temperature of less than about 100° F. and having a melting point of from 70–160° F., evaporating said volatile solvent from the refractory grains to produce refractory grains having a thin coating of one of said class substantially covering the individual grains, mixing said coated grains with a solution of the prehydrolyzed alkyl silicate solution in a solvent therefor to form a slurry, and then immediately pouring the resulting slurry in a master mold, allowing said slurry to gel, and then removing the gelled mold from the master.

15. A formed refractory mold consisting essentially of, the reaction product of (1) a particulate refractory substantially uniformly coated with a thin coating of an essentially nonvolatile chemically basic organic gelling agent, said organic gelling agent being characterized by air stability at ambient temperatures and being solid at temperatures of from 70–160° F., and (2) a binder solution of a prehydrolyzed alkyl silicate in a solvent.

References Cited by the Examiner
UNITED STATES PATENTS

| | | | |
|---|---|---|---|
| 2,730,514 | 1/1956 | Wallace et al. | 22—193 |
| 2,948,935 | 8/1960 | Carter | 22—196 |
| 2,984,635 | 5/1961 | Harris | 117—100 |
| 3,020,609 | 2/1962 | Brown et al. | 22—193 |
| 3,024,209 | 3/1962 | Ferrigno | 117—100 |
| 3,080,256 | 3/1963 | Bundy | 117—100 |

MARCUS U. LYONS, *Primary Examiner.*